Figure 1:
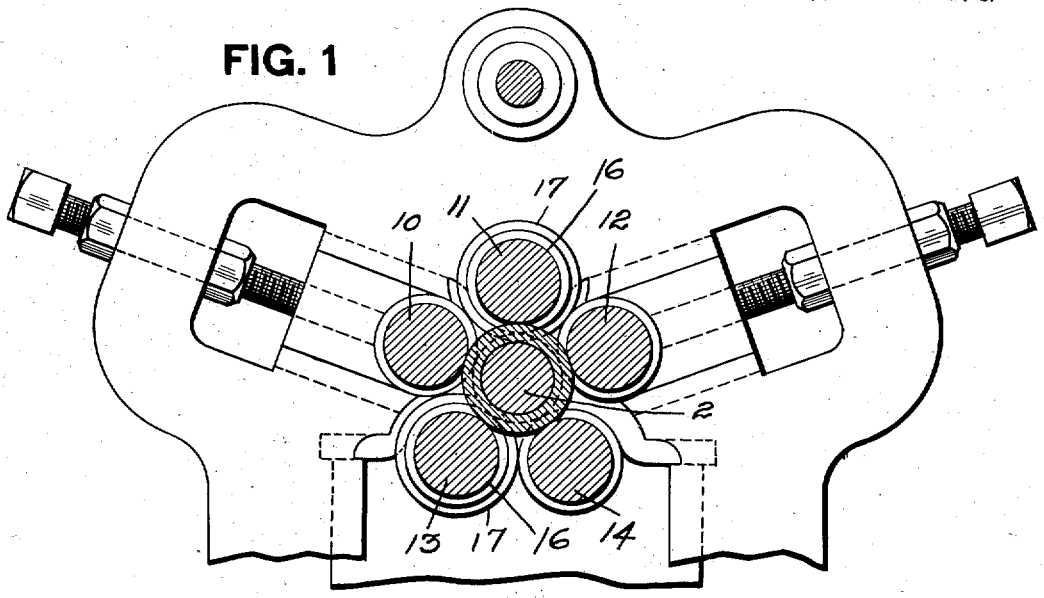

No. 12,363. REISSUED JUNE 20, 1905.

H. W. & J. A. HOCK.

MACHINE FOR ROLLING PIPE COUPLINGS, &c.

APPLICATION FILED APR. 11, 1904.

3 SHEETS—SHEET 1.

WITNESSES.

J. R. Killen

Robert C. Lotter

INVENTORS.

Henry W. Hock

John A. Hock

By Kay Lotter & Winter attorneys

No. 12,363. REISSUED JUNE 20, 1905.

H. W. & J. A. HOCK.

MACHINE FOR ROLLING PIPE COUPLINGS, &c.

APPLICATION FILED APR. 11, 1904.

3 SHEETS—SHEET 2.

WITNESSES.

J. R. Keller

Robert C. Totten

INVENTORS.

Henry W. Hock

John A. Hock

By Kay Totten & Winter

Attorneys

No. 12,363. REISSUED JUNE 20, 1905.

H. W. & J. A. HOCK.

MACHINE FOR ROLLING PIPE COUPLINGS, &c.

APPLICATION FILED APR. 11, 1904.

3 SHEETS—SHEET 3.

WITNESSES.

J. R. Keller

Robert C. Potter

INVENTORS.

Henry W. Hock

John A. Hock

By Kay Potter & Winter

Attorneys

No. 12,363. Reissued June 20, 1905.

UNITED STATES PATENT OFFICE.

HENRY W. HOCK, OF YOUNGSTOWN, OHIO, AND JOHN A. HOCK, OF PITTSBURG, PENNSYLVANIA, ASSIGNORS TO NATIONAL TUBE COMPANY, OF PITTSBURG, PENNSYLVANIA, A CORPORATION OF NEW JERSEY.

MACHINE FOR ROLLING PIPE-COUPLINGS, &c.

SPECIFICATION forming part of Reissued Letters Patent No. 12,363, dated June 20, 1905.

Original No. 748,948, dated January 5, 1904. Application for reissue filed April 11, 1904. Serial No. 202,704.

*To all whom it may concern:*

Be it known that we, HENRY W. HOCK, residing in Youngstown, State of Ohio, and JOHN A. HOCK, residing in Pittsburg, State of Pennsylvania, citizens of the United States, have invented a new and useful Improvement in Machines for Rolling Pipe-Couplings, &c., of which the following is a specification.

Our invention relates to apparatus for manufacturing pipe sockets or couplings and similar ring-shaped metal articles.

The object of our invention is to provide apparatus whereby in the welding of the socket or coupling it is provided either with countersunk recesses on its inner face at the ends or with its internal face tapered or flaring toward both ends, or with both.

A further object of our invention is to provide such articles in the welding and shaping operation with internal screw-threads.

In the manufacture of pipe sockets or couplings a plate or bar of the necessary length, width, and thickness for the desired coupling is bent into ring form and then welded and shaped to form the coupling. The couplings are then threaded internally and counterbored at each end, either to give a proper finish or else to remove the threads for a short distance, so as to form an enlarged portion at the ends of the couplings, which will permit them to be screwed onto the pipes to such a distance as to cover the threads on the pipe where they run out. This counterboring is usually done at only one end of the coupling at a time, thus necessitating clamping the coupling into the chuck twice in order to counterbore both ends. The time and labor consumed in doing this adds materially to the cost of the couplings.

One object of our invention is to provide welding and shaping apparatus for manufacturing couplings or sockets and similar articles which will form such articles with countersunk recesses at the ends, so as to dispense with the counterboring above referred to, thus resulting in a material saving of time and labor in finishing the couplings. Furthermore, such recesses diminish the distance through which the tap must cut in threading the coupling, so that a considerable saving of time in threading also results.

Pipe sockets or couplings are preferably tapered or flared slightly toward both ends on those portions where the threads are cut, so that when the couplings are screwed onto the pipes a tight joint will be formed. Heretofore the couplings have been welded on a straight mandrel and the internal tapering has been done either by means of a taper-reaming tool or by forcing into the end or ends of the coupling a conical plunger or plungers, so as to expand the coupling and taper the same internally. According to either method additional operations had to be performed, thus adding to the labor and cost of these articles.

Another object of our invention is to provide welding and shaping apparatus whereby pipe couplings or sockets and similar articles will in the welding and shaping operation be also formed with internal tapers at both ends, so as to dispense with either the reaming or the expanding steps, which heretofore have been necessary, and resulting in a material saving in time, labor, and cost in manufacturing such articles.

To the accomplishment of the aforesaid objects our invention consists, generally stated, in welding and shaping apparatus comprising a mandrel having a working face corresponding in diameter and contour to the interior of the coupling to be made and either having at the sides of such working-face portions of enlarged diameter which, during the welding and shaping of the coupling project into the pass of the welding and shaping apparatus and form the countersunk recesses in the inner face of the ends of the coupling or being tapered from its ends toward its middle portion, or both. In order to permit the removal of the mandrel from the welded coupling, it is made in two transversely-separable sections, and suitable means are provided for holding said sections against endwise displacement during the welding and shaping operation.

The invention also consists in a mandrel of the kind described, together with rolls and coacting flanges or shoulders on the rolls and mandrel to prevent endwise movement of the mandrel or mandrel-sections during the welding and shaping operation.

The invention also consists in providing such a mandrel with screw-threads, so that the coupling will be formed with internal threads simultaneous with the shaping and welding operation.

Figure 2:
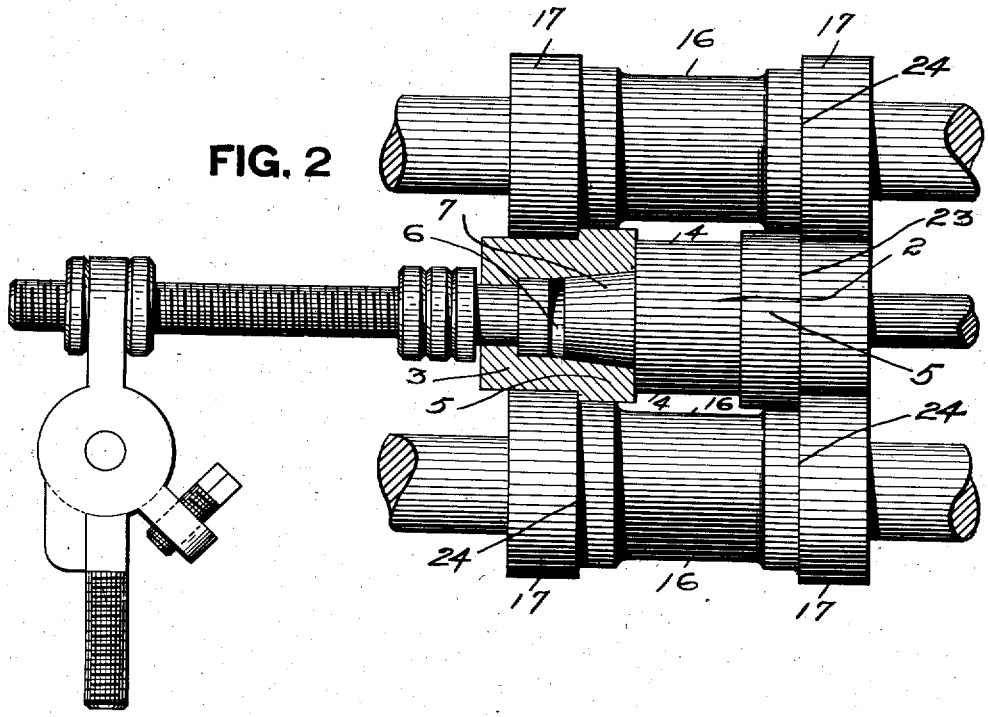
Figure 3:
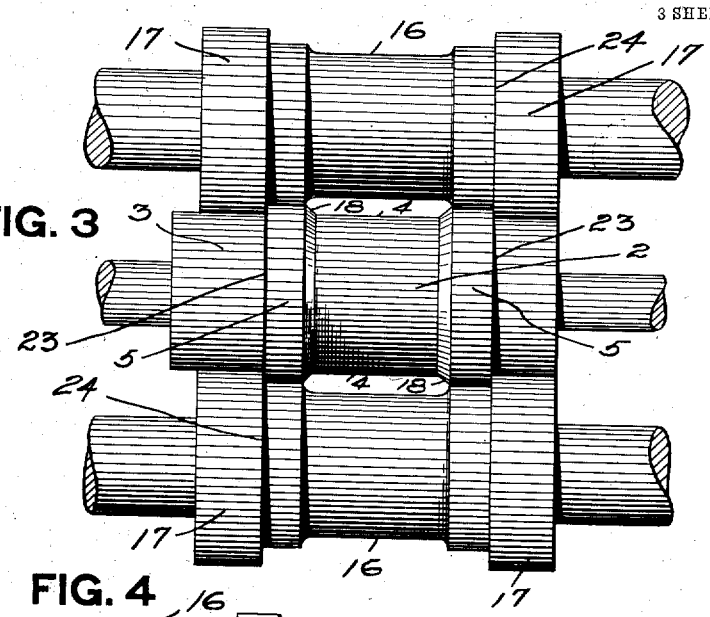
Figure 4:
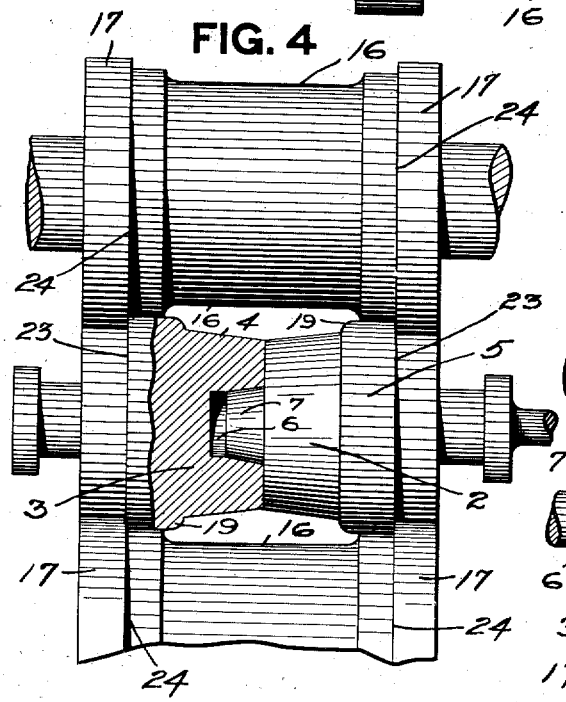
Figure 5:
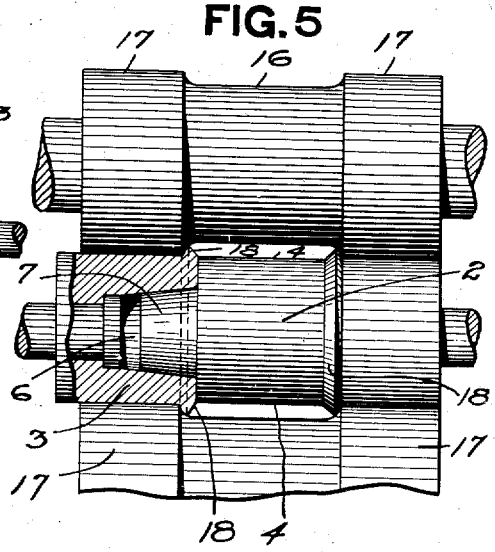
Figure 6:
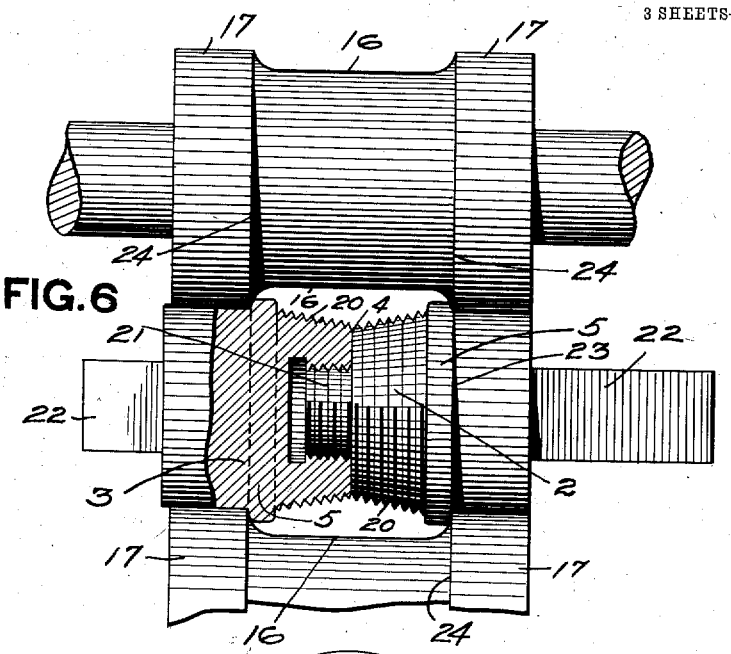
Figure 7:
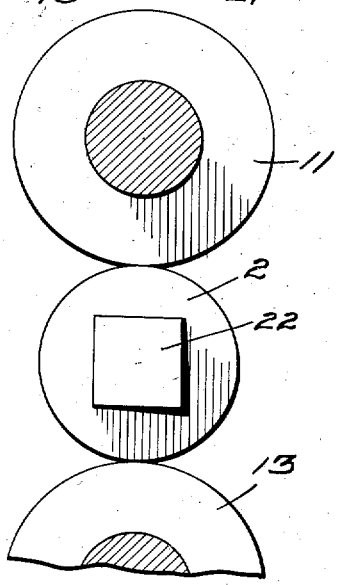
Figure 8:
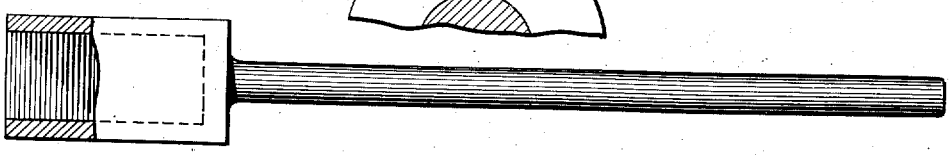

In the accompanying drawings, Figure 1 is a cross-section through rolls suitable for carrying out our invention. Fig. 2 is a longitudinal section showing in side elevation rolls and a mandrel embodying our invention. Fig. 3 is a similar view of apparatus for making a slightly-modified form of coupling. Fig. 4 is a similar view of apparatus for making still another modification of coupling. Fig. 5 is a similar view showing apparatus having a modified form of rolls. Fig. 6 is a similar view showing a mandrel for forming internal screw-threads on the coupling. Fig. 7 is an end elevation of the rolls and mandrel shown in Fig. 6, and Fig. 8 is a side view, partly in section, of a key employed with the mandrel shown in Figs. 6 and 7.

The essential element of our apparatus consists of the mandrel, which preferably is made in two transversely-separable sections 2 and 3 to facilitate its removal from the welded coupling, said sections when united forming a mandrel having a central working face 4 corresponding in size and contour to the diameter and internal shape of the coupling to be made. At each side of this working face the mandrel is provided with enlarged portions 5, which during the operation of the apparatus form bearing-faces for the roll-flanges and project inwardly beyond said flanges to form the countersunk recesses in the ends of the coupling. One of these mandrel-sections is provided with a socket or recess 6 for receiving a teat or projection 7 on the other section in order to aline said sections. One of the sections, such as the section 2, is provided with a handle for manipulating the same, and suitable means will be provided for holding the other section, such as the section 3, in position in the welding and shaping apparatus. Various means may be employed for this purpose, such as the screw shown in Fig. 2. This mandrel may be used in connection with any suitable apparatus for welding and shaping the couplings thereon, such as the hammer-dies frequently employed for this purpose; but we prefer to use rolls, and preferably a cluster of five rolls, such as shown in Fig. 1 and as ordinarily employed for this purpose. This cluster of rolls will comprise three upper rolls 10, 11, and 12, mounted in stationary bearings in suitable housings and two lower rolls 13 and 14, mounted in movable bearings in the housings, so that the roll-cluster can be opened up to permit the removal of the mandrel and welded coupling therefrom. This apparatus will be understood by those skilled in the art without further description.

The several welding-rolls have suitable working faces 16 and are provided at each side thereof with flanges 17, which form bearing-faces contacting with the mandrel to confine the blank. The working faces 16 of the rolls may be of any desired shape and width and will correspond to the finished coupling to be produced. The mandrel also may be of various shapes, and the enlarged portions 5 at each end of the mandrel will also vary according to the style of coupling to be formed. In all cases, however, these enlarged portions are of greater width than the corresponding bearing-faces of the rolls and project into the pass formed between the mandrel and rolls so as to form countersunk recesses of various shapes and depths at both ends of the couplings. In Fig. 2 the working face 4 of the mandrel is practically cylindrical, and the enlarged portions 5 at each end are also practically cylindrical, so as to form a coupling having at each end practically cylindrical recesses ending in square shoulders. In Fig. 3 the enlarged portions of the mandrel are modified, so that shallow beveled countersinks are formed at the ends of the coupling, this being accomplished by the bevel-faces 18 on the mandrel. Practically the same construction is followed in Fig. 5. In Fig. 4 the enlarged portions 5 of the mandrel are provided with rounded shoulders 19, and the working face of said mandrel between said enlarged portions is tapered from both ends toward the center thereof, so as to form a coupling of the shape of the pass shown in said figure. In order to permit the removal of this mandrel from the coupling, it is necessary that it be divided transversely at the middle of the working face instead of at one side, as shown in Figs. 2, 3, and 5. In Fig. 6 is shown a mandrel having practically cylindrical enlarged portions 5 and having the working face tapering from both sides to the center and formed with screw-threads 20. This mandrel also is divided at the middle of its working face, and the two sections preferably are united, so that they must revolve together—as, for instance, providing one thereof with a threaded recess and the other with the threaded projection 21, fitting into the same. Each of the madrel-sections shown in Fig. 6 is provided with a polygonal projection 22 in order to receive a tool, such as shown in Fig. 8, whereby such sections can be held against rotation in order that the rolls may revolve the welded socket around on said mandrel-sections and screw the latter out of said socket.

With all forms of our sectional mandrel suitable means must be provided for preventing endwise movement of said sections during the shaping and welding operation. Various means for this purpose may be employed, but preferably will consist in suitable coöperating annular shoulders on the mandrel-sections and rolls. As shown in Figs. 2, 3, and 4, the outer ends of the mandrel-sections are reduced in size to provide shoulders 23, and the flanges of the rolls are provided with enlarged ends to provide shoulders 24, which coöperate with the shoulders on the mandrel and prevent endwise movement of the mandrel-sections. In Figs. 5 and 6 the enlarged portions 5 of the mandrel fit into the pass of the rolls and abut against the inner faces of the flanges 17 of the rolls to prevent endwise movement of the mandrel-sections. Various other arrangements, however, may be employed for preventing the separation or endwise movement of the mandrel-sections.

In the use of our invention the mandrel-sections are placed in position between the rolls, as shown in the drawings. A heated blank of the necessary width and length is then fed to the rolls in the usual way and is coiled by the same around the mandrel and is simultaneously welded and shaped. During this operation the mandrel is free to rotate with the rolls, and the enlarged portions at each side of the working face of the mandrel form countersunk recesses in the ends of the coupling. As soon as the welding and shaping is accomplished the rolls are opened up in the usual way, and one of the mandrel-sections, such as the section 2, is removed, together with the coupling, which will adhere thereto, the other mandrel-section 3 preferably remaining in the rolls. The welded coupling is stripped from the mandrel-section 2, and the latter is again placed in the rolls and the operation repeated. With the form of mandrel shown in Fig. 6 after the welding and shaping has been accomplished the rolls will be opened up sufficiently to allow the coöperating shoulders on the mandrel and rolls to pass each other, and the mandrel-sections are then held against rotation, and the continued rotation of the rolls will spin the coupling around, and thus unscrew the same from the mandrel-sections.

With all forms of our apparatus the sockets or couplings are provided with countersunk recesses at each end by the mere act of welding and shaping the same, so that the usual counterboring is dispensed with and a material saving in the cost of the coupling is effected. With the forms shown in Figs. 4 and 6 the sockets are also provided with internal tapers, so that subsequent expansion or reaming is dispensed with. Couplings such as shown in Figs. 2, 3, 4, and 5 must be threaded internally in order to complete them; but the countersinks at both ends reduce the distance through which the tap must cut, thus also making a distinct saving in the time and cost of threading.

What we claim as our invention, and desire to secure by Letters Patent, is—

1. In a device for rolling pipe-couplings, &c., rolls and a sectional mandrel, said rolls and sectional mandrel each being provided with coacting flanges, said flanges being located in relation to each other to cause the locking together or holding in place of the sectional mandrel during the rolling action.

2. In a device for rolling pipe-couplings, &c., rolls and a sectional mandrel, each having a plurality of sets of coacting flanges, the bearing-faces of the flanges of the rolls abutting against and coacting with the bearing-faces of the flanges upon the mandrel-sections, whereby said sections during the operation of forming a coupling may be held in proper place by the flanges of the rolls, the second set of bearing-faces on the mandrel being wider than the corresponding set of bearing-faces on the rolls.

3. In a device for rolling pipe-couplings, &c., rolls and a sectional mandrel, each having a plurality of sets of coacting flanges, the bearing-faces of the flanges of the rolls abutting against and coacting with the bearing-faces of the flanges upon the mandrel-sections, whereby said sections during the operation of forming a coupling may be held in proper place by the flanges of the rolls, the second set of bearing-faces on the mandrel being wider than the corresponding set of bearing-faces on the rolls, said mandrel having oppositely-disposed inclines, and its sections having interengaging members.

4. In a machine for rolling pipe-couplings, &c., rolls and a sectional mandrel, the said rolls and mandrel each having coacting flanges forming bearing-faces oppositely disposed and serving to hold the sections of the mandrel in place during the operation of forming a coupling and separation of the rolls permitting the separation of the sections of the mandrel for discharging the coupling, the said mandrel-sections having interengaging portions.

5. In a machine for rolling pipe-couplings, &c., rolls and a sectional mandrel disposed between said rolls, said rolls and mandrel each provided with shoulders and coacting flanges constituting bearing-faces oppositely disposed and serving to hold the sections of the mandrel in place during the operation of forming a coupling and separation of the rolls permitting the separation of the sections of the mandrel for discharging the coupling, the rolls having their central portions of smaller diameter than their bearing-faces and the mandrel having its bearing-faces wider than the coacting faces of the rolls to form countersinks in the inside ends of the couplings.

6. In a machine for forming pipe-couplings, &c., rolls and a sectional mandrel disposed between said rolls, the mandrel-sections having interengaging portions, said rolls and mandrel each provided with shoulders and coacting flanges constituting bearing-faces oppositely disposed and serving to hold the sections of the mandrel in place during the operation of forming a coupling and separation of the rolls permitting the separation of the sections of the mandrel for discharging the coupling, the rolls having their central portions of smaller diameter than their bearing-faces and the mandrel having its bearing-faces wider than the coacting faces of the rolls, and the said faces and reduced portion being connected by inclined portions.

7. In a machine for rolling pipe-couplings, &c., a sectional mandrel, rolls upon opposite sides of said mandrel, said rolls and mandrel-sections each having coacting flanges disposed in relation to each other to cause the locking together or holding in place of the sectional mandrel during the rolling action, and means on said rolls and mandrel for forming a recess in the coupling.

8. In a machine for rolling pipe-couplings, &c., a roll and a coöperating sectional mandrel provided with means for forming screw-threads in the couplings, the rolls and mandrel-sections being provided with coacting flanges disposed in relation to each other to cause the locking together or holding in place of the mandrel-sections during the operation of forming a coupling by said flanges.

9. In a machine for rolling pipe-couplings, &c., a roll and a coöperating sectional mandrel provided with means for tapering the couplings from opposite ends and for forming screw-threads thereon, said roll and mandrel-sections being provided with coacting flanges disposed to cause the locking together or holding in place of the mandrel-sections during the rolling action.

10. In an apparatus for welding and shaping pipe-couplings or similar articles, the combination of a central mandrel and a cluster of rolls surrounding the same, said rolls having flanges at each end adapted to contact with the mandrel and confine the blank, said mandrel being composed of separable interengaging sections corresponding in diameter to the interior of the article to be formed and having a portion of enlarged diameter at one end projecting into the pass of the rolls, and coöperating annular shoulders on the mandrel, one on each section, and rolls to prevent endwise movement of the mandrel during the welding and shaping operation.

11. In an apparatus for welding and shaping pipe-couplings or similar articles, the combination of a central mandrel and a cluster of rolls surrounding the same, said rolls having flanges at each end adapted to contact with the mandrel and confine the blank, said mandrel of separable interengaging sections corresponding in diameter to the interior of the article to be formed and having a portion of enlarged diameter at one end projecting into the pass of the rolls, square inwardly-facing shoulders on the rolls, and a square outwardly-facing shoulder on each section of the mandrel contacting with the shoulders on the rolls and adapted to prevent endwise movement of the mandrel during the welding and shaping operation.

12. In apparatus for welding and shaping pipe-couplings and similar articles, the combination of a mandrel and a plurality of welding and shaping devices coöperating therewith, said welding and shaping devices having working faces and flanges or collars on each side of said working faces to contact with the mandrel and confine the blank, and said mandrel being formed in two transversely-separable sections and provided with a central portion corresponding in diameter and shape to the interior of the coupling and of less width than the working faces of the welding and shaping devices, and having at each side of said central portion a portion of enlarged diameter, which enlarged portions project inwardly beyond the flanges of the welding and shaping devices.

13. In apparatus for welding and shaping pipe-couplings and similar articles, the combination of a mandrel and a plurality of rolls coöperating therewith, said rolls having at the sides of their working faces flanges which contact with the mandrel and confine the blank, and said mandrel being formed in two transversely-separable sections and provided with a central portion of less width than the working faces of said rolls and corresponding in diameter and shape to the interior of the coupling and having at each side of said central portion a portion of enlarged diameter which projects into the pass of the rolls.

14. In apparatus for welding and shaping pipe-couplings and similar articles, the combination of a mandrel formed in two transversely-separable sections, a cluster of rolls surrounding said mandrel, said rolls having at the sides of their working faces flanges which contact with the mandrel and confine the blank, said mandrel having a central portion corresponding in diameter and shape to the interior of the coupling and having at both sides of said central portion portions of enlarged diameter which project into the pass of the rolls, and coöperating collars or shoulders on the rolls and mandrel-sections to prevent endwise movement of the latter.

15. In apparatus for welding and shaping pipe-couplings and similar articles, the combination of a mandrel divided into two sections at the transverse middle of said mandrel and having a working face tapering from both ends toward said transverse middle, a cluster of rolls surrounding said mandrel, said rolls having working faces of such width as to cover the tapering portions of said mandrel and having flanges at the sides of the working face which contact with the mandrel and confine the blank, and coöperating annular shoulders on said rolls and mandrel-sections to prevent endwise movement of the latter.

16. In apparatus for welding and shaping pipe-couplings or similar articles, the combination of rolls, a mandrel disposed between said rolls, said rolls having flanges at their ends constituting bearing-faces contacting with the mandrel, said mandrel having a tapered portion lying inside the roll-pass, and coöperating annular shoulders on the rolls and mandrel to prevent endwise movement of the mandrel during the rolling operation.

17. In apparatus for welding and shaping pipe-couplings and similar articles, the combination of rolls, a mandrel disposed between said rolls, said rolls having flanges at their ends constituting bearing-faces contacting with the mandrel, said mandrel being composed of interengaging sections and having its ends of larger diameter than the central portions thereof and wider than the corresponding bearing-faces of the rolls to form countersinks in the ends of the coupling, and means to prevent endwise movement of the mandrel-sections during the welding operation including coöperating annular shoulders on the rolls and one at least of said mandrel-sections.

In testimony whereof we have hereunto set our hands.

HENRY W. HOCK.
JOHN A. HOCK.

Witnesses:
F. W. WINTER,
ROBERT C. TOTTEN.